Patented Aug. 1, 1939

2,167,751

UNITED STATES PATENT OFFICE 2,167,751

BUTTERMILK CASEIN PRODUCT

Charles G. Harford, Wollaston, Mass., assignor to Arthur D. Little, Inc., Cambridge, Mass., a corporation of Massachusetts No Drawing. Application October 10, 1936, Serial No. 105,081

4 Claims. (Cl. 134—12)

This invention relates to casein solutions and to methods of making them.

This invention has as one object the manufacture of casein solutions which are stable over long periods of time, and which may be used in the preparation of various coatings such as water paints and for many other purposes for which this type of solution is generally suitable.

It is an object of the present invention to manufacture a coating or filling substance from milk products wherein a certain amount of the fats and fat-like substances contained therein may be combined with the casein to produce distinct advantages in the preparation and in the finished product.

I have found that by the procedure to be described herein I can prepare a satisfactory coating product without drying and processing the milk product to obtain a dry casein. In fact, I have found that the drying, which has heretofore been universally followed in regular commercial usage is to be avoided in order to obtain good results.

My invention is particularly applicable to the production of a solution of a more or less viscous nature to which pigments of various types may be added to produce coatings. Such coatings when prepared in the manner described herein have the advantage that they spread more evenly and are more free of the objectionable foaming tendency of the casein type of coating. I find that there is no sweating out of the fat after the coating is dried which is somewhat unexpected because large percentages of fat in casein have heretofore been open to this objection.

I find that the present invention enables me to use sources of material which heretofore have been considered inferior because of certain objectionable substances in the casein obtained from them. The caseins from these sources are typically relatively high in fat content (i. e. 5% or more), albumen, and other fat-like substances, such as lecithin. The ash content also is low (i. e. 2% or less) as compared with ordinary casein now regularly used.

Caseins of these types, of which buttermilk casein is a good example, have found little commercial use. Buttermilk, for example, which is obtained in large quantities as a by-product in the manufacture of butter from sour cream, is commonly used wet or dry to make a stock feed or is thrown away. This invention shows a more profitable manner of utilizing by-products of this nature.

Other objects will appear from the following disclosure.

In the past, the preparation of casein solutions for use in making paints, coatings, finishes, etc., was generally accomplished by treating the casein with an alkali, thereby putting it into solution. The resulting solutions, which were alkaline, were subject to physical and chemical changes which made them unfit for use after the passage of a relatively short time (a few days, generally, or sometimes hours). In recent years, however, the work of Atwood, Iddings, and Regnier, as described in U. S. Patents Nos. 1,506,081, 1,893,608, 2,023,389, and others have resulted in the development of acidic casein solutions which retain their stability and their physical and chemical characteristics over long periods of time.

The casein solution prepared in accordance with the present invention is of this general type. It differs, however, in the fact that it includes a particular combination of casein with other materials not heretofore considered useful or practical, and has certain advantages in manufacture and properties as will be pointed out in greater detail below.

The successful commercial utilization of caseins relatively high in fat, albumen, and lecithin has not hitherto been obtained, so far as I am aware. Caseins of this type are most readily obtained in buttermilk, but may be prepared if desired from ordinary skim milk as casein to which or from which the various materials have been added or removed. A typical casein of the kind to be treated in accordance with this invention will contain before treatment at least 5% fat, as compared with between 0.5 and 1.5% for ordinary caseins, and generally less than 2% ash, as compared with between 2% and 8% for ordinary caseins. It will also contain appreciable amounts of other materials, including albumen and lecithin. Ordinary caseins now commercially used have insignificant amounts of most of these other materials. The fats and fat-like substances such as lecithin in buttermilk obviously are more intimately associated with the casein than the butter fat that is removed in making butter. I maintain this relation by keeping the material wet until the swelling agent is supplied. Where the wet material before swelling must be kept for some time or transported for considerable distance, it is desirable to add a specific preservative. Pine oil has been used for this purpose. It does not adversely affect the subsequent treatment of the material. Albumen is ordinarily disadvantageous, for the reason that it is an irreversible colloid which becomes insoluble by heating or drying and therefore it acts when the casein is dried, to form a film which makes the re-dissolving of the casein impracticable or impossible. This feature has always hitherto been a drawback of caseins of the type described in this invention, e. g. buttermilk casein, hence drying should be avoided. However, the presence of fats, and of the other non-casein materials, albumen, lecithin, etc., confers certain desirable properties upon such caseins, which properties are not present, or are present in only a minor degree, in caseins now commercially used. The non-casein ingredients recited above remain in the finished product in essentially the proportions indicated, except that the ash content of the product will of course be increased because of the addition of inorganic swelling and dissolving agents as described below.

I have found that buttermilk is particularly desirable because of the way in which the fats, lecithin, albumen, etc. are distributed therein. Whereas, skim milk casein which does not contain appreciable quantities of those materials is according to usual commercial practice dried before using I find that the buttermilk casein—fat—lecithin composition, if dried by customary methods before using, is distinctly inferior and in many cases worthless. The term "undried" is used herein and in the claims to mean the maintenance of the materials in such a wet state, from the time they are in the original buttermilk until they are in the coating composition, that appreciable drying is avoided. The solids are, of course, washed, as hereinafter described, but at no time is the amount of water in the material so low as to permit appreciable drying of the solids.

In carrying out this invention, the material (e. g. buttermilk casein and it sassociated solids) is treated with a swelling agent such as sodium fluoride and ammonium chloride. Various other swelling agents are suitable, but sodium fluoride appears to be the most effective. The mixture is then heated for a suitable length of time, or the heating may be initiated before the swelling agent is added, until the casein is well swollen and is capable of being dissolved by substances mildly alkaline in reaction. Such substances include salts of strong bases and weaker acids, such as borax, sodium bisulfite, and trisodium phosphate, also various soaps, and organic bases such as triethanol amine. The same solvent effect can be obtained by first adding an alkali such as sodium hydroxide, and then neutralizing it partly or wholly by adding a suitable acid. Whatever procedure of adding alkaline materials is used, these materials should be added to secure proper dissolving of the casein, which occurs within a fairly definite pH range. When the proper amount of alkaline material has been added, the pH of the resulting casein solution will preferably lie between the isolectric points for casein and for water i. e., between 4.6 and 7. A higher pH (beyond 7) will result in too alkaline a solution, subject to many of the objections of alkaline casein solutions hitherto used; on the other hand, if the solution is much more acid than about pH=4.6, the casein tends to precipitate and give an entirely unsuitable product.

As a specific example of the present process, I cite the following: To a suspension of previously washed undried buttermilk casein and associated solids, drained to contain 110 grams of buttermilk solids (including casein, fat, albumen, lecithin, ash, etc.) in 550 grams of water, add 10 grams of sodium fluoride and 5 grams of ammonium chloride, and heat the mixture at 155° to 160° for about ¾ hour. To the resultant well-swollen body then add 12 grams of borax, and stir the mixture until "solution" of the casein is effected and the mixture is uniform and smooth. The resulting product is smooth, thick, viscous and stable.

If it is desired to make a casein paint, the solution produced as stated above is mixed with a suitable pigment. Thus, for making a white paint, 100 grams of "Titanox" (titanium dioxide pigment) is added to the solution as produced in the example, and the whole is passed through a conventional paint mill, whereupon it is ready for use. It may be used at once, but this is not necessary, as it will keep without change or deterioration indefinitely.

The non-casein ingredients present in the original raw material which is utilized in this invention contribute improved properties to the product and eliminate some disadvantages hitherto encountered in utilizing swollen stable casein solutions of this general type. These non-casein ingredients suppress the undesirable foaming which occurs in the utilization for certain purposes (e. g. on dilution and stirring to make paints) of solutions such as that described by Atwood in U. S. Patent No. 1,893,608. Furthermore, these ingredients serve to plasticize the paints and other products made in accordance with this invention, and give to them distinctly improved flowing and leveling qualities. While I do not know precisely the mechanism by which these improved qualities are produced, I believe that the fatty materials present have considerable influence toward securing them. The fats and fat-like substances retained in the product do not appear to affect odor or keeping qualities adversely. When the material is used as a paint or coating the fats and fat-like substances retained in the product from the raw material do not tend to separate out and appear on the surface, as would be expected from past experiences. The presence of the albumen appears to increase the water resistant character of the product.

While the preferred application of the invention is described herein it is understood that the scope of the invention is not limited except insofar as it is limited by the following claims.

I claim:

1. The method of converting acid precipitated buttermilk casein and some of its accompanying solids into a smooth, viscous, liquid coating composition which comprises carrying down the acid precipitated casin and certain accompanying solids, including albumin and fats and fat-like substances, the fats and fat-like substances being present in the proportions of about five per cent or more of said fats and fat-like substances to one hundred per cent of butter milk casein, from their original accompanying whey, and then adding an alkaline casein dissolving agent and maintaining enough water with the solids to prevent drying thereof until the final coating composition is completed.

2. A smooth, viscous, liquid coating composition comprising undried buttermilk solids, including acid precipitated casein, albumin, and about five per cent or more fats and fat-like substances such as lecithin, said coating composition including an alkaline casein dissolving agent in which said casein has been dissolved while in the undried state.

3. A smooth, viscous, liquid coating composition comprising undried buttermilk solids, including acid precipitated casein, albumin, and about five per cent or more fats and fat-like substances such as lecithin, said coating composition including an alkaline casein dissolving agent in which said casein has been dissolved while in the undried state, said coating composition also including an agent capable of swelling casein.

4. A smooth, viscous, liquid coating composition comprising undried buttermilk solids, including acid precipitated casein, albumin, and about five per cent or more fats and fat-like substances such as lecithin, said coating composition including an alkaline casein dissolving agent in which said casein has been dissolved while in the undried state, said composition also including sodium fluoride.

CHARLES G. HARFORD.